US012529435B2

(12) United States Patent
Matsumoto et al.

(10) Patent No.: US 12,529,435 B2
(45) Date of Patent: Jan. 20, 2026

(54) ELECTRIC RESISTANCE WELDED STEEL PIPE AND METHOD FOR MANUFACTURING THE SAME

(71) Applicant: JFE Steel Corporation, Tokyo (JP)

(72) Inventors: Akihide Matsumoto, Tokyo (JP); Ryo Nakazawa, Tokyo (JP); Atsushi Matsumoto, Tokyo (JP); Shinsuke Ide, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 489 days.

(21) Appl. No.: 18/028,872

(22) PCT Filed: Sep. 15, 2021

(86) PCT No.: PCT/JP2021/034009
§ 371 (c)(1),
(2) Date: Mar. 28, 2023

(87) PCT Pub. No.: WO2022/075027
PCT Pub. Date: Apr. 14, 2022

(65) Prior Publication Data

US 2024/0026999 A1 Jan. 25, 2024

(30) Foreign Application Priority Data

Oct. 5, 2020 (JP) ................................ 2020-168164

(51) Int. Cl.
*B21C 37/08* (2006.01)
*C21D 1/18* (2006.01)
(Continued)

(52) U.S. Cl.
CPC ................ *F16L 9/17* (2013.01); *B21C 37/08* (2013.01); *C21D 1/18* (2013.01); *C21D 1/84* (2013.01);
(Continued)

(58) Field of Classification Search
None
See application file for complete search history.

(56) References Cited

U.S. PATENT DOCUMENTS

2006/0151074 A1 7/2006 Ishikawa et al.
2012/0018028 A1* 1/2012 Shimamura ............. C21D 9/08 148/519
(Continued)

FOREIGN PATENT DOCUMENTS

CN 102549189 A 7/2012
CN 104220622 A 12/2014
(Continued)

OTHER PUBLICATIONS

Office Action with Search Report issued Jun. 24, 2024, by the National Intellectual Property Administration, P. R. China in corresponding Chinese Patent Application No. 202180066581.7. (8 pages).
(Continued)

*Primary Examiner* — Kim S. Horger
(74) *Attorney, Agent, or Firm* — Buchanan Ingersoll & Rooney PC

(57) ABSTRACT

An electric resistance welded steel pipe and a method for manufacturing the same are provided. The present invention relates to an electric resistance welded steel pipe including a base metal zone and a weld. In the electric resistance welded steel pipe, steel microstructures at a wall-thickness-wise middle of the base metal zone are steel microstructures in which a bcc phase is present in a volume fraction greater than or equal to 80%, an average grain size is less than or equal to 15.0 μm, and an A value, defined by a predetermined equation, is 0.55 or greater and 0.85 or less; a yield ratio in a pipe axis direction is less than or equal to 90%; and a
(Continued)

Charpy absorbed energy at −40° C. of the base metal zone is greater than or equal to 100 J.

20 Claims, 1 Drawing Sheet

(51) Int. Cl.

| | |
|---|---|
| ***C21D 1/84*** | (2006.01) |
| ***C21D 6/00*** | (2006.01) |
| ***C21D 8/10*** | (2006.01) |
| ***C21D 9/08*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/16*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/38*** | (2006.01) |
| ***C22C 38/42*** | (2006.01) |
| ***C22C 38/44*** | (2006.01) |
| ***C22C 38/46*** | (2006.01) |
| ***C22C 38/50*** | (2006.01) |
| ***F16L 9/17*** | (2006.01) |

(52) U.S. Cl.

CPC ............ *C21D 6/001* (2013.01); *C21D 6/002* (2013.01); *C21D 6/004* (2013.01); *C21D 6/005* (2013.01); *C21D 6/008* (2013.01); *C21D 8/105* (2013.01); *C21D 9/085* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/38* (2013.01); *C22C 38/42* (2013.01); *C22C 38/44* (2013.01); *C22C 38/46* (2013.01); *C22C 38/50* (2013.01); *C21D 2211/001* (2013.01); *C21D 2211/002* (2013.01); *C21D 2211/005* (2013.01); *C21D 2211/008* (2013.01); *C21D 2211/009* (2013.01)

(56) References Cited

U.S. PATENT DOCUMENTS

| | | | |
|---|---|---|---|
| 2015/0083266 A1 | 3/2015 | Toyoda et al. | |
| 2016/0289788 A1* | 10/2016 | Shibata .................. | C22C 38/54 |
| 2021/0164082 A1 | 6/2021 | Nagano et al. | |

FOREIGN PATENT DOCUMENTS

| | | | |
|---|---|---|---|
| CN | 105378131 | A | 3/2016 |
| CN | 111041344 | A | 4/2020 |
| EP | 2484792 | A1 | 8/2012 |
| EP | 3020840 | A1 | 5/2016 |
| EP | 3 239 317 | A1 | 11/2017 |
| EP | 3 715 494 | A1 | 9/2020 |
| JP | 2004124228 | A | 4/2004 |
| JP | 2012021214 | A | 2/2012 |
| JP | 5293903 | B1 | 9/2013 |
| JP | 6260757 | B1 | 1/2018 |
| JP | 6575734 | B1 | 9/2019 |
| JP | 6690787 | B1 | 4/2020 |
| JP | 6690788 | B1 | 4/2020 |
| TW | 200502410 | A | 1/2005 |
| WO | 2015079661 | A1 | 6/2015 |
| WO | 2017163987 | A1 | 9/2017 |
| WO | 2020022481 | A1 | 1/2020 |

OTHER PUBLICATIONS

Extended European Search Report issued Dec. 18, 2023, by the European Patent Office in corresponding European Patent Application No. 21877329.9-1103. (10 pages).

International Search Report and Written Opinion for International Application No. PCT/JP2021/034009, dated Dec. 7, 2021, 5 pages.

Kumagai et al., "Microstructural Features of Cold-Rolled Carbon Steel Evaluated by X-ray Diffraction Line Profile Analysis and Their Correlation with Mechanical Properties", ISIJ International, vol. 54, 2014, No. 1, pp. 206-211.

Takaki et al., "Dislocation Characterization by the Direct-fitting/modified Williamson-Hall (DF/mWH) Method in Cold Worked Ferritic Steel", ISIJ International, 59 (2019), pp. 567-572.

Ungar et al., "The Effect of Dislocation Contrast on X-ray Line Broadening: A New Approach to Line Profile Analysis", Appl. Phys. Lett., 69(21), Nov. 18, 1996, pp. 3173-3175.

Taiwanese Office Action with Search Report for Taiwanese Application No. 110136002 dated May 6, 2022, 4 pages.

* cited by examiner

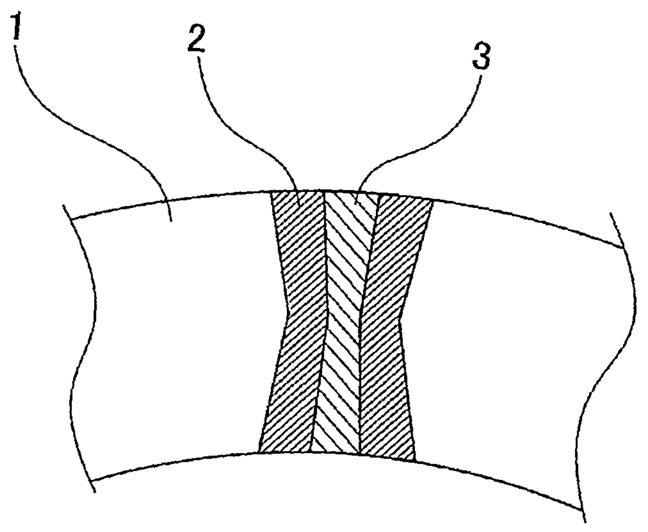
1
2
3

ELECTRIC RESISTANCE WELDED STEEL PIPE AND METHOD FOR MANUFACTURING THE SAME

CROSS REFERENCE TO RELATED APPLICATIONS

This is the U.S. National Phase application of PCT/JP2021/034009, filed Sep. 15, 2021, which claims priority to Japanese Patent Application No. 2020-168164, filed Oct. 5, 2020, the disclosures of these applications being incorporated herein by reference in their entireties for all purposes.

FIELD OF THE INVENTION

The present invention relates to an electric resistance welded steel pipe and a method for manufacturing the same. The electric resistance welded steel pipe is suitable for civil engineering building structures, line pipes, and the like.

BACKGROUND OF THE INVENTION

Steel pipes that are used in large structures, such as civil engineering building structures and line pipes, are required to have a low yield ratio and high toughness, from the standpoint of buckling resistance, impact resistance, and the like.

Among the steel pipes that are used in large structures such as those described above are electric resistance welded steel pipes. Electric resistance welded steel pipes are steel pipes that are manufactured as follows. A hot rolled steel sheet (hot rolled steel strip) coiled in a coil form is subjected to cold roll forming while the hot rolled steel sheet is continuously uncoiled, to form a cylindrical open pipe, the open pipe is then subjected to electric resistance welding in which pipe-circumferential butt portions thereof are melted by high-frequency electrical resistance heating and pressure-welded with upsetting caused by squeeze rolls, and the resultant is subjected to diameter reduction performed by sizing rolls, to have a predetermined outside diameter.

Since electric resistance welded steel pipes are continuously produced by cold forming, they have advantages, such as high productivity and high dimensional accuracy. However, one drawback with electric resistance welded steel pipes is their high yield ratios, which result from the work hardening experienced by the material during the pipe production process. Furthermore, when a larger wall thickness is to be obtained, a larger amount of work hardening is to be caused during the pipe production process, and, therefore, a problem arises in that the yield ratio resulting from the pipe production is further increased.

Regarding technologies for solving the problem described above, Patent Literature 1 and Patent Literature 2, for example, propose electric resistance welded steel pipes. Patent Literature 1 discloses a thick wall electric resistance welded steel pipe in which a metal structure of a base material steel sheet contains, by area ratio, 50 to 92% of polygonal ferrite, the polygonal ferrite has an average grain size of 15 μm or less, an electric resistance weld zone has a hardness of Hv160 to 240, and a structure of the electric resistance weld zone is bainite, fine grain ferrite, and pearlite or fine grain ferrite and bainite.

Patent Literature 2 discloses an as-rolled electric resistance welded steel pipe for a line pipe, which is an electric resistance welded steel pipe in which, in a metallographic microstructure of a wall thickness direction central portion of the base metal portion, a polygonal ferrite fraction is from 60 to 90%, an average crystal grain diameter is 15 μm or less, and a coarse crystal grain ratio, which is an areal ratio of crystal grains having a crystal grain diameter of 20 μm or more, is 20% or less, and a yield ratio in a pipe axis direction is from 80 to 95%.

PATENT LITERATURE

PTL 1: Japanese Patent No. 5293903
PTL 2: Japanese Patent No. 6260757

SUMMARY OF THE INVENTION

The electric resistance welded steel pipes described in Patent Literature 1 and Patent Literature 2 are those in which the grains have been refined to ensure high toughness. However, in instances where grains are refined, an increase in the yield ratio occurs, and, therefore, achieving both a low yield ratio and high toughness is difficult in the case of thick-walled pipes with a wall thickness greater than 15 mm.

Aspects of the present invention have been made in view of the above-described circumstances, and an object according to aspects of the present invention is to provide an electric resistance welded steel pipe and a method for manufacturing the same; the electric resistance welded steel pipe has a low yield ratio and high toughness and is, therefore, suitable for large structures, such as civil engineering building structures and line pipes.

As used in accordance with aspects of the present invention, the expression "low yield ratio" means that a yield ratio (=yield stress (MPa)/tensile strength (MPa)×100) in a pipe axis direction is less than or equal to 90%. The yield ratio is preferably less than or equal to 85%

As used in accordance with aspects of the present invention, the expression "high toughness" means that a Charpy absorbed energy at −40° C. of a base metal zone is greater than or equal to 100 J. The Charpy absorbed energy is preferably greater than or equal to 150 J.

The yield stress, the tensile strength, and the Charpy absorbed energy can be measured with the methods described later in the Examples section.

The present inventors diligently performed studies to solve the problem described above. As a result, attention was focused on the fact that, regarding the deformation of electric resistance welded steel pipes, the movement of mobile dislocations causes plastic deformation to progress at an early stage of the deformation, that is, at a relatively low-stress stage. Specifically, it was discovered that among electric resistance welded steel pipes having an equal dislocation density, those having a higher ratio of mobile dislocations have a lower yield stress. Furthermore, it was also discovered that in instances where a hot rolled steel sheet is roll formed at a low temperature, the movement of dislocations introduced into grains is inhibited, and, consequently, the dislocations remain within the grains as mobile dislocations, without forming cells.

It was found that in instances where mobile dislocations remain within the grains with the mobile dislocations being controlled to be within an appropriate range, the resulting electric resistance welded steel pipe has a reduced yield ratio and improved toughness even if the electric resistance welded steel pipe is a thick-walled pipe.

Aspects of the present invention were completed based on the findings described above, and a summary of aspects of the present invention is as follows.

[1] An electric resistance welded steel pipe including a base metal zone and a weld, wherein steel microstructures at a wall-thickness-wise middle of the base metal zone are steel microstructures in which a bcc phase is present in a volume fraction greater than or equal to 80%, an average grain size is less than or equal to 15.0 μm, and an A value, defined by equation (1), is 0.55 or greater and 0.85 or less;

a yield ratio in a pipe axis direction is less than or equal to 90%; and a Charpy absorbed energy at −40° C. of the base metal zone is greater than or equal to 100 J, $$A=\varphi/((\pi\rho/2)^{1/2}\times b) \quad (1)$$

where φ is a parameter representing a working ratio determined by X-ray diffraction, ρ is a dislocation density ($m^{-2}$), b is a Burgers vector (m) of dislocations, and π is a ratio of a circumference of a circle to a diameter of the circle.

[2] The electric resistance welded steel pipe according to [1], wherein the base metal zone has a chemical composition containing, in mass %, C: 0.001% or greater and 0.30% or less,
Si: 0.01% or greater and 2.0% or less,
Mn: 0.20% or greater and 3.0% or less,
P: 0.050% or less,
S: 0.020% or less,
Al: 0.005% or greater and 0.10% or less,
N: 0.010% or less, and
Ti: 0.15% or less, with the balance being Fe and incidental impurities.

[3] The electric resistance welded steel pipe according to [2], wherein the chemical composition further contains, in mass %, one or two or more selected from Cu: 1.0% or less,
Ni: 1.0% or less,
Cr: 1.0% or less,
Mo: 1.0% or less,
Nb: 0.15% or less,
V: 0.15% or less,
Ca: 0.010% or less, and
B: 0.010% or less.

[4] The electric resistance welded steel pipe according to any one of [1] to [3], wherein the base metal zone has a wall thickness of 15 mm or greater and 30 mm or less.

[5] The electric resistance welded steel pipe according to any one of [1] to [4], wherein the steel microstructures at the wall-thickness-wise middle of the base metal zone are steel microstructures in which a total volume fraction of ferrite and bainite is greater than or equal to 85%.

[6] A method for manufacturing the electric resistance welded steel pipe according to any one of [1] to [5], the method including:

a hot rolling step in which a steel material is heated to a heating temperature of 1100° C. or greater and 1300° C. or less, the steel material is subsequently hot rolled by using a rough rolling finishing temperature of 850° C. or greater and 1150° C. or less, a finishing delivery temperature of 750° C. or greater and 900° C. or less, and a total rolling reduction ratio associated with a temperature of equal to and less than 930° C. of 50% or greater, to form a hot rolled sheet;

a cooling step in which the hot rolled sheet is cooled by using an average cooling rate of 5° C./s or greater and 30° C./s or less and a finish cooling temperature of 400° C. or greater and 650° C. or less, the average cooling rate and the finish cooling temperature each being based on a temperature at a sheet-thickness-wise middle of the hot rolled sheet;

a coiling step in which the hot rolled sheet is coiled at a temperature of 400° C. or greater and 650° C. or less to form a hot rolled steel sheet;

a pipe production step in which the hot rolled steel sheet is subjected to roll forming at a temperature of −40° C. or less to form a cylindrical steel sheet, and the cylindrical steel sheet is welded by electric resistance welding to form a steel pipe material; and a sizing step in which the steel pipe material is subjected to diameter reduction at a temperature of −40° C. or less to form the electric resistance welded steel pipe.

[7] The method for manufacturing the electric resistance welded steel pipe according to [6], wherein the steel material has a chemical composition containing, in mass %, C: 0.001% or greater and 0.30% or less,
Si: 0.01% or greater and 2.0% or less,
Mn: 0.20% or greater and 3.0% or less,
P: 0.050% or less,
S: 0.020% or less,
Al: 0.005% or greater and 0.10% or less,
N: 0.010% or less, and
Ti: 0.15% or less, with the balance being Fe and incidental impurities.

[8] The method for manufacturing the electric resistance welded steel pipe according to [7], wherein the chemical composition further contains, in mass %, one or two or more selected from Cu: 1.0% or less,
Ni: 1.0% or less,
Cr: 1.0% or less,
Mo: 1.0% or less,
Nb: 0.15% or less,
V: 0.15% or less,
Ca: 0.010% or less, and
B: 0.010% or less.

[9] The method for manufacturing the electric resistance welded steel pipe according to any one of [6] to [8], wherein the base metal zone of the electric resistance welded steel pipe has a wall thickness of 15 mm or greater and 30 mm or less.

Aspects of the present invention can provide an electric resistance welded steel pipe having both a low yield ratio and high toughness and provide a method for manufacturing the same; the electric resistance welded steel pipe can even be a thick-walled pipe.

BRIEF DESCRIPTION OF THE DRAWING

The FIGURE is a schematic diagram illustrating a cross section of a region containing a weld of an electric resistance welded steel pipe, which is a cross section in a pipe circumferential direction (a cross section perpendicular to a pipe axis direction).

DETAILED DESCRIPTION OF EMBODIMENTS OF THE INVENTION

An electric resistance welded steel pipe according to embodiments of the present invention will be described below.

The electric resistance welded steel pipe according to aspects of the present invention includes a base metal zone and a weld (electric resistance weld) that extends in a pipe axis direction. In accordance with aspects of the present invention, steel microstructures at a wall-thickness-wise middle of the base metal zone are steel microstructures in which a bcc phase is present in a volume fraction greater than or equal to 80%, an average grain size is less than or equal to 15.0 μm, and an A value, defined by equation (1), is 0.55 or greater and 0.85 or less; a yield ratio in the pipe axis direction is less than or equal to 90%; and a Charpy absorbed energy at −40° C. of the base metal zone is greater than or equal to 100 J.

$$A=\varphi/((\pi\rho/2)^{1/2}\times b) \quad (1)$$

In equation (1), φ is a parameter representing a working ratio determined by X-ray diffraction, ρ is a dislocation density ($m^{-2}$), b is a Burgers vector (m) of dislocations, and π is a ratio of a circumference of a circle to a diameter of the circle.

First, reasons for the limitations on the steel microstructures and properties of the electric resistance welded steel pipe according to aspects of the present invention will be described.

Volume Fraction of Bcc Phase at Wall-Thickness-Wise Middle of Base Metal Zone: Greater Than or Equal to 80%

In the bcc (body-centered cubic lattice) phase, temperature has a larger effect on the movement of dislocations than in phases such as fcc (face-centered cubic lattice) and hcp (hexagonal close-packed structure). Accordingly, in the bcc phase, the effect of temperature reduction in inhibiting the movement of dislocations is large. That is, the greater the volume fraction of the bcc phase, the greater the number of dislocations that are inhibited from moving in instances in which the production of an electric resistance welded steel pipe is performed at a low temperature. Consequently, dislocations are unlikely to be entangled with one another, which results in a high proportion of mobile dislocations. As a result, the yield ratio is reduced. To produce such effect sufficiently, the volume fraction of the bcc phase is specified to be greater than or equal to 80%. The volume fraction of the bcc phase is preferably greater than or equal to 85% and more preferably greater than or equal to 90%.

The upper limit of the volume fraction of the bcc phase is not particularly specified. However, obtaining a bcc single-phase microstructure requires rapid cooling to be performed on the steel sheet after hot rolling, and, therefore, it is difficult to completely avoid phases other than the bcc phase at a wall-thickness-wise middle of a thick-walled pipe. Accordingly, the volume fraction of the bcc phase is preferably less than or equal to 98% and more preferably less than or equal to 97%. The remainder, other than the bcc phase, is the fcc phase or cementite, and the volume fraction of the remainder is preferably less than or equal to 20%.

The measurement of the volume fraction of the bcc phase is carried out by X-ray diffraction as will be described later in the Examples section. A test specimen to be used for the measurement of the steel microstructures is prepared as follows. A cross section of the base metal zone is mirror-polished, the cross section being at a position of 90° in the pipe circumferential direction with respect to the position of the weld, which is assumed to be 0°, and being parallel to both a pipe longitudinal direction and a wall thickness direction, and subsequently, a region of 100 μm of the cross section is electrolytically polished to remove a processed surface layer. The diffraction plane is to be a plane at the wall-thickness-wise middle. Mo-Ka radiation is used for the measurement. The volume fraction of the bcc phase is determined from the integral intensities of the (200), (220), and (311) planes of the fcc iron and the (200) and (211) planes of the bcc iron. Furthermore, the volume fraction of the fcc phase is also determined.

Average Grain Size of Grains at Wall-Thickness-Wise Middle of Base Metal Zone: Less Than or Equal to 15.0 μm In accordance with aspects of the present invention, the grains are defined as regions surrounded by boundaries that have a misorientation angle of 15° or greater regarding adjacent crystals. If the average grain size of grains at the wall-thickness-wise middle of the base metal zone is greater than 15.0 μm, a total area of the grain boundaries, which pose an obstacle to crack propagation, is small, and, consequently, high toughness, which is intended in accordance with aspects the present invention, cannot be achieved. Accordingly, the average grain size is specified to be less than or equal to 15.0 μm. The average grain size is preferably less than or equal to 10.0 μm and more preferably less than or equal to 8.0 μm. Note that the smaller the average grain size, the greater the yield ratio, and, therefore, it is preferable that the average grain size be greater than or equal to 2.0 μm. The average grain size is more preferably greater than or equal to 3.0 μm.

The average grain size is an average equivalent circular diameter of grains, where the grains (i.e., grain boundaries) are defined as regions surrounded by boundaries that have a misorientation angle of 15° or greater regarding adjacent crystals. The equivalent circular diameter (i.e., grain size) is a diameter of a circle having an area equal to that of the grain of interest.

The measurement of the average grain size can be carried out with the method described later in the Examples section. A test specimen is prepared as follows: a cross section of the base metal zone is mirror-polished, the cross section being at a position of 90° in the pipe circumferential direction with respect to the position of the weld, which is assumed to be 0°, and being parallel to both a pipe longitudinal direction and a wall thickness direction. A histogram of a grain size distribution at the wall-thickness-wise middle of the test specimen is calculated by using an SEM/EBSD method (the histogram is a graph in which the horizontal axis represents the grain size, and the vertical axis represents the abundance ratio for the different grain sizes). An arithmetic mean of the grain sizes is determined as the average grain size. The conditions for the measurement include an acceleration voltage of 15 kV, a measurement region of 500 μm×500 μm, and a measurement step size (measurement resolution) of 0.5 μm. Note that in the grain size analysis, grains with a grain size of less than 2.0 μm are regarded as measurement noise and excluded from the analysis objects.

A Value: 0.55 or Greater and 0.85 or Less

The A value is a parameter correlated to a distribution state of dislocations and can be defined by equation (1), shown above.

Equation (1) is an equation representing a relationship between φ, ρ, and b; φ is a parameter representing a working ratio determined by X-ray diffraction, ρ is a dislocation density ($m^{-2}$), and b is a Burgers vector (m) of dislocations (Reference Literature 3).

Greater A values indicate more uniform distributions of dislocations introduced into the grains, fewer numbers of dislocations that have formed cells, and greater tendencies for a higher proportion of the dislocations to remain as mobile dislocations in the grains.

Dislocations that have formed cells are entangled with one another, and, therefore, causing the dislocations to move requires a high stress. On the other hand, mobile dislocations can move under a low stress compared with dislocations that have formed cells. Accordingly, the greater the number of mobile dislocations (i.e., the higher the proportion of mobile dislocations) within the grains, the lower the stress necessary for the initiation of plastic deformation, and, consequently, a low yield ratio is achieved. Furthermore, the greater the number of mobile dislocations within the grains, the higher the degree to which plastic deformation is promoted at the tip of cracks; consequently, cleavage fractures are less likely to occur, and, therefore, high toughness is achieved. For these reasons, it is important that equation (1), shown above, be satisfied in accordance with aspects of the present invention.

It was discovered that in the case of electric resistance welded steel pipes of the related art in which dislocations have formed cells, the A value defined by equation (1), shown above, is less than 0.55. Accordingly, in accordance with aspects of the present invention, the A value is specified to be greater than or equal to 0.55 so as to ensure a sufficient number of mobile dislocations for achieving the desired yield ratio. The greater the A value, the more preferable. However, increasing the A value requires the pipe production to be performed at a lower temperature. Accordingly, the A value is specified to be less than or equal to 0.85, from the standpoint of an increase in the load of the pipe production due to an increase in deformation resistance, temperature control for a hydraulic system and the like, and the cost of cooling. The A value is preferably 0.60 or greater and 0.80 or less. The A value is more preferably 0.61 or greater and 0.78 or less.

Note that the A value can be controlled to be within the above-mentioned range by controlling the manufacturing conditions ((temperatures for) a pipe production step and a diameter reduction step), which will be described later.

Regarding equation (1), shown above, the dislocation density ρ, the parameter φ, and the Burgers vector b can be determined with the methods described later in the Examples section.

Regarding the dislocation density p, X-ray diffraction is to be performed, and a test specimen to be used is prepared as follows. A cross section of the base metal zone that is parallel to both a pipe longitudinal direction and a wall thickness direction is mirror-polished, and subsequently, a region of 100 μm of the cross section is electrolytically polished to remove a processed surface layer. The diffraction plane is to be a plane at the wall-thickness-wise middle. The dislocation density p can be determined from the results, by using a modified Williamson-Hall method and a modified Warren-Averbach method (Reference Literature 1 and 2). The parameter φ can be determined from the results of the X-ray diffraction, by using a direct-fitting/modified Williamson-Hall method (Reference Literature 3). The Burgers vector b may be specified to be $0.248\times10^{-9}$ m, which is an interatomic distance of bcc iron in <111>, which is a slip direction thereof.

[Reference Literature 1] T. Ungar and A. Borbely: Appl. Phys. Lett., 69 (1996), 3173.

[Reference Literature 2] M. Kumagai, M. Imafuku, S. Ohya: ISIJ International, 54 (2014), 206.

[Reference Literature 3] S. Takaki, T. Masumura and T. Tsuchiyama: ISIJ International, 59 (2019), 567.

Yield Ratio in Pipe Axis Direction: Less Than or Equal to 90%

In the electric resistance welded steel pipe according to aspects of the present invention, the yield ratio (=yield stress (MPa)/tensile strength (MPa)×100) of the base metal zone in the pipe axis direction is less than or equal to 90%, where the yield ratio is a yield ratio at a position of 90° in the pipe circumferential direction with respect to the position of the weld, which is assumed to be 0°. If the yield ratio is greater than 90%, seismic resistance associated with the use in column members and the like of civil engineering building structures and seismic resistance and buckling resistance associated with the use in line pipes are reduced. The yield ratio is preferably less than or equal to 87% and more preferably less than or equal to 86%. The yield ratio is preferably greater than or equal to 55%, more preferably greater than or equal to 65%, and even more preferably greater than or equal to 75%, so as to ensure a necessary proof stress.

Charpy Absorbed Energy at −40° C. of Base Metal Zone: Greater Than or Equal to 100 J In the electric resistance welded steel pipe according to aspects of the present invention, the Charpy absorbed energy at −40° C. of the base metal zone is greater than or equal to 100 J. If the Charpy absorbed energy is less than 100 J, seismic resistance associated with the use in column members and the like of civil engineering building structures and with the use in line pipes is reduced. The Charpy absorbed energy is preferably greater than or equal to 150 J and more preferably greater than or equal to 160 J. Furthermore, when the Charpy absorbed energy is high, the average grain size is small, and the yield ratio is high; therefore, the Charpy absorbed energy is preferably less than or equal to 500 J and more preferably less than or equal to 400 J.

The yield strength, the tensile strength, and the yield ratio can be determined by conducting a tensile test in accordance with the specifications of JIS Z 2241, as will be described later in the Examples section. The Charpy absorbed energy can be determined by conducting a Charpy impact test at a test temperature of −40° C. on a standard V-notch test specimen in accordance with the specifications of JIS Z 2242, as will be described later in the Examples section.

The properties of the electric resistance welded steel pipe according to aspects of the present invention are achieved as a result of the presence of the steel microstructures described above. The steel microstructures according to aspects of the present invention may further have the following feature so as to further improve the properties.

In the steel microstructures at the wall-thickness-wise middle of the base metal zone, it is preferable that a total volume fraction of ferrite and bainite be greater than or equal to 85% based on a total volume of the steel microstructures at the wall-thickness-wise middle of the base metal zone. The remaining microstructures, other than ferrite and bainite, are formed of one or two or more selected from pearlite, martensite, and austenite. Preferably, a total volume fraction of the remaining microstructures is less than or equal to 15%.

Ferrite is a bcc phase and a soft microstructure. Bainite is a bcc phase and is harder than ferrite and softer than pearlite, martensite, and austenite. Bainite is a microstructure with excellent toughness. In instances where ferrite and bainite are mixed with a hard microstructure, the yield ratio is reduced. However, a difference in hardness causes stress concentration, which increases the possibility that interfaces become fracture initiation sites, and as a result, toughness is reduced. Accordingly, it is preferable that the total volume fraction of ferrite and bainite be greater than or equal to 85%. More preferably, the total volume fraction is greater than or equal to 90%. Furthermore, the total volume fraction is preferably less than or equal to 98% and more preferably less than or equal to 97%.

Pearlite is a duplex microstructure of a bcc phase and cementite, and martensite is a bcc phase. Both are hard microstructures. Herein, the pearlite is considered to be a bcc phase for approximation. Pearlite is a microstructure that, when mixed with a soft microstructure, reduces the yield ratio but is a microstructure that reduces toughness. Accordingly, it is preferable that the volume fraction of pearlite be 0% or greater and 15% or less. It is more preferable that the volume fraction of pearlite be 1% or greater and 13% or less.

Martensite is a microstructure that, when mixed with a soft microstructure, reduces the yield ratio but is a microstructure that reduces toughness. Accordingly, it is preferable that the volume fraction of martensite be 0% or greater and 15% or less. It is more preferable that the volume fraction of martensite be 1% or greater and 13% or less.

Austenite is an fcc phase and a hard microstructure. Austenite is a microstructure that, when mixed with a soft microstructure, reduces the yield ratio but is a microstructure that reduces toughness. Accordingly, it is preferable that the volume fraction of austenite be 0% or greater and 10% or less. It is more preferable that the volume fraction of austenite be 1% or greater and 8% or less.

The above-described microstructures other than austenite are formed from deformation bands at the austenite grain boundaries or within austenite grains, with the deformation bands serving as nucleation sites. In hot rolling, a rolling reduction at low temperatures at which recrystallization of austenite is unlikely to occur may be increased. In this case, a large number of dislocations can be introduced into the austenite, which can refine the austenite and can introduce a large number of deformation bands into the grains. As a result, areas of the nucleation sites are increased, which increases the frequency of nucleation and, therefore, can refine the steel microstructures.

In accordance with aspects of the present invention, the above-described steel microstructures may be present within a region extending ±1.0 mm from the wall-thickness-wise middle of the base metal zone, which is assumed to be a center, in the wall thickness direction, and in this case, too, the above-described effect can be likewise produced. Accordingly, in accordance with aspects of the present invention, the expression "steel microstructures at a wall-thickness-wise middle of the base metal zone" means that the above-described steel microstructures are present at any location within a region extending ±1.0 mm from the wall-thickness-wise middle, which is assumed to be a center, in the wall thickness direction.

The steel microstructures can be observed with the method described later in the Examples section. First, a test specimen for the microstructure observation is prepared as follows. A piece is cut such that the surface to be observed is a cross section of the base metal zone that is at a position of 90° in the pipe circumferential direction with respect to the position of the weld, which is assumed to be 0°, and that is perpendicular to the pipe longitudinal direction, and such that the surface is a cross section at the wall-thickness-wise middle. The piece is then polished and subsequently etched with nital. The microstructure observation is carried out by observing microstructures at the wall-thickness-wise middle and capturing an image of the microstructures, with an optical microscope (magnification: 1000×) or a scanning electron microscope (SEM, magnification: 1000×). Next, from the obtained optical microscope image or SEM image, area fractions of bainite, and the remainder (ferrite, pearlite, martensite, and austenite) are determined. The area fraction of each of the microstructures is determined as follows: the observation is performed on 5 or more fields of view, and an average of the obtained values of the fields of view is calculated as the area fraction. Note that in accordance with aspects of the present invention, each of the area fractions determined by the microstructure observation is assumed to be the volume fraction of each of the microstructures.

The ferrite is a product produced by diffusional transformation and is a substantially recovered microstructure with a low dislocation density. The ferrite includes polygonal ferrite and quasi-polygonal ferrite.

The bainite is a multi-phase microstructure formed of lath-form ferrite, which has a high dislocation density, and cementite.

The pearlite is a eutectoid microstructure formed of iron and iron carbide (ferrite+cementite) and is a lamellar microstructure in which linear ferrite and cementite are alternately located.

The martensite is a bcc phase and a lath-form low temperature transformation microstructure with a very high dislocation density. In SEM images, the martensite shows bright contrast compared with ferrite and bainite.

Note that since it is difficult to distinguish martensite from austenite in optical microscope images and SEM images, the volume fraction of martensite is determined as follows: the area fraction of microstructures determined to be martensite or austenite from observation of the obtained SEM image is measured, thereafter, the volume fraction of austenite, which is measured with the method described below, is subtracted from the measured value of the area fraction, and the resulting value is designated as the volume fraction of martensite.

The measurement of the volume fraction of austenite is carried out by X-ray diffraction by using a test specimen prepared in a manner similar to that of the test specimen used in the measurement of the dislocation density. From the obtained integral intensities of the (200), (220), and (311) planes of fcc iron and the (200) and (211) planes of bcc iron, the volume fraction of austenite is determined.

Now, regarding a chemical composition of the electric resistance welded steel pipe according to aspects of the present invention, preferred ranges and reasons for the limitations, in terms of ensuring the properties, the steel microstructures, and the like, will be described.

Reasons for limiting the chemical composition of the base metal zone of the electric resistance welded steel pipe will be described. Note that in the present specification, "%" used in the context of the composition of steel is "mass %" unless otherwise specified.

It is preferable that the base metal zone according to aspects of the present invention have a chemical composition containing, in mass %, C: 0.001% or greater and 0.30% or less, Si: 0.01% or greater and 2.0% or less, Mn: 0.20% or greater and 3.0% or less, P: 0.050% or less, S: 0.020% or less, Al: 0.005% or greater and 0.10% or less, N: 0.010% or less, and Ti: 0.15% or less, with the balance being Fe and incidental impurities.

C: 0.001% or Greater and 0.30% or Less

C is an element that increases the strength of steel through solid solution strengthening. Furthermore, C is an element that reduces a ferrite transformation start temperature, thereby contributing to refining the microstructures. To produce such effects, C needs to be included in an amount greater than or equal to 0.001%. Furthermore, C promotes the formation of pearlite, increases hardenability to contribute to the formation of martensite, and contributes to stabilizing austenite. Accordingly, C is also an element that contributes to the formation of a hard phase. If a C content is greater than 0.30%, a proportion of a hard phase is increased, which reduces toughness, and weldability is also degraded. Accordingly, the C content is specified to be 0.001% or greater and 0.30% or less. The C content is preferably greater than or equal to 0.010% and more preferably greater than or equal to 0.040%. Furthermore, the C content is preferably less than or equal to 0.27% and more preferably less than or equal to 0.25%.

Si: 0.01% or Greater and 2.0% or Less

Si is an element that increases the strength of steel through solid solution strengthening. To produce such effect, Si is included in an amount greater than or equal to 0.01%. However, if a Si content is greater than 2.0%, the yield ratio is increased, and the toughness is reduced. Accordingly, the Si content is specified to be 0.01% or greater and 2.0% or less. The Si content is preferably greater than or equal to 0.05% and more preferably greater than or equal to 0.10%. Furthermore, the Si content is preferably less than or equal to 1.0% and more preferably less than or equal to 0.50%.

Mn: 0.20% or Greater and 3.0% or Less

Mn is an element that increases the strength of steel through solid solution strengthening. Furthermore, Mn is an element that reduces the ferrite transformation start temperature, thereby contributing to refining the steel microstructures. To produce such effect, Mn needs to be included in an amount greater than or equal to 0.20%. However, if a Mn content is greater than 3.0%, solid solution strengthening and the refining of the steel microstructures result in an increase in the yield stress, and, consequently, the yield ratio intended in accordance with aspects of the present invention cannot be achieved. Accordingly, the Mn content is specified to be 0.20% or greater and 3.0% or less. The Mn content is preferably greater than or equal to 0.40% and more preferably greater than or equal to 0.60%. Furthermore, the Mn content is preferably less than or equal to 2.5% and more preferably less than or equal to 2.0%.

P: 0.050% or Less

P segregates at grain boundaries and causes inhomogeneity in the material, and, therefore, it is preferable that P be reduced as much as possible to be present as an incidental impurity; however, up to 0.050% P is permissible. Accordingly, a P content is specified to be less than or equal to 0.050%. The P content is preferably less than or equal to 0.020% and more preferably less than or equal to 0.010%. The lower limit of the P content is not particularly limited; however, excessively reducing P results in an increase in the cost of smelting, and, therefore, the P content is preferably greater than or equal to 0.002%.

S: 0.020% or Less

S is usually present in the form of MnS in steel. When subjected to a hot rolling step, MnS is elongated to become thin, which adversely affects ductility. Accordingly, in accordance with aspects of the present invention, it is preferable that S be reduced as much as possible; however, up to 0.020% S is permissible. Accordingly, a S content is specified to be less than or equal to 0.020%. The S content is preferably less than or equal to 0.010% and more preferably less than or equal to 0.008%. The lower limit of the S content is not particularly limited; however, excessively reducing S results in an increase in the cost of smelting, and, therefore, the S content is preferably greater than or equal to 0.0002%.

Al: 0.005% or Greater and 0.10% or Less

Al is an element that acts as a strong deoxidizing agent. To produce such effect, Al needs to be included in an amount greater than or equal to 0.005%. However, if an Al content is greater than 0.10%, weldability is degraded, and alumina-based inclusions are increased, which results in degraded surface quality. Furthermore, the toughness of the weld is reduced. Accordingly, the Al content is specified to be 0.005% or greater and 0.10% or less. The Al content is preferably greater than or equal to 0.010% and more preferably greater than or equal to 0.015%. The Al content is preferably less than or equal to 0.080% and more preferably less than or equal to 0.070%.

N: 0.010% or Less

N is an incidental impurity and an element that acts to reduce toughness by firmly immobilizing dislocation movement. In accordance with aspects of the present invention, it is desirable that N be reduced as much as possible to be present as an impurity; however, a N content of up to 0.010% is permissible. Accordingly, the N content is specified to be less than or equal to 0.010%. The N content is preferably less than or equal to 0.0080%. From the standpoint of the cost of refining, it is preferable that the N content be greater than or equal to 0.0008%. More preferably, the N content is greater than or equal to 0.0010%.

Ti: 0.15% or Less

Ti is an element that forms fine carbides and nitrides in steel, thereby contributing to improving the strength of the steel. Furthermore, Ti has a high affinity for N and, therefore, forms a nitride with N in steel, thereby rendering the N harmless. Accordingly, Ti is also an element that contributes to improving the toughness of steel. It is preferable that Ti be included in an amount greater than or equal to 0.001% so as to produce the effect. However, if a Ti content is greater than 0.15%, the yield ratio is increased, and the toughness is reduced. Accordingly, the Ti content is specified to be less than or equal to 0.15%. The Ti content is more preferably greater than or equal to 0.005% and even more preferably greater than or equal to 0.008%. The Ti content is more preferably less than or equal to 0.13% and even more preferably less than or equal to 0.10%.

The balance, other than the components described above, is Fe and incidental impurities. Note that O may be present as an incidental impurity in an amount less than or equal to As referred to herein, the O is total oxygen, which includes O present in the form of an oxide.

In accordance with aspects of the present invention, it is preferable that the fundamental chemical composition be formed of the components described above. In accordance with aspects of the present invention, to further improve the properties, it is possible to additionally include, as necessary, one or two or more selected from Cu: 1.0% or less, Ni: 1.0% or less, Cr: 1.0% or less, Mo: 1.0% or less, Nb: 0.15% or less, V: or less, Ca: 0.010% or less, and B: 0.010% or less, in addition to the above-described fundamental components.

Cu: 1.0% or Less (and 0% or Greater)

Cu is an element that increases the strength of steel through solid solution strengthening. Accordingly, Cu may be included as necessary. In instances where Cu is to be included, it is preferable that a Cu content be greater than or equal to 0.01% so as to produce the effects. On the other hand, if Cu is included in an amount greater than 1.0%, the toughness may be reduced, and weldability may be degraded. Accordingly, in instances where Cu is to be included, it is preferable that the Cu content be less than or equal to 1.0%. The Cu content is more preferably greater than or equal to and even more preferably greater than or equal to 0.10%. Furthermore, the Cu content is more preferably less than or equal to 0.70% and even more preferably less than or equal to Ni: 1.0% or Less (and 0% or Greater)

Ni is an element that increases the strength of steel through solid solution strengthening. Accordingly, Ni may be included as necessary. In instances where Ni is to be included, it is preferable that a Ni content be greater than or equal to 0.01% so as to produce the effect. On the other hand, if Ni is included in an amount greater than 1.0%, the toughness may be reduced, and weldability may be degraded. Accordingly, in instances where Ni is to be included, it is preferable that the Ni content be less than or equal to 1.0%. The Ni content is more preferably greater than or equal to and even more preferably greater than or equal to 0.10%. Furthermore, the Ni content is more preferably less than or equal to 0.70% and even more preferably less than or equal to Cr: 1.0% or Less (and 0% or Greater)

Cr is an element that increases the hardenability of steel, thereby increasing the strength of the steel. Accordingly, Cr may be included as necessary. In instances where Cr is to be included, it is preferable that a Cr content be greater than or equal to 0.01% so as to produce the effect. On the other hand, if Cr is included in an amount greater than 1.0%, the toughness may be reduced, and weldability may be degraded. Accordingly, in instances where Cr is to be included, it is preferable that the Cr content be less than or equal to 1.0%. The Cr content is more preferably greater than or equal to 0.05% and even more preferably greater than or equal to 0.10%. Furthermore, the Cr content is more preferably less than or equal to 0.70% and even more preferably less than or equal to 0.50%.

Mo: 1.0% or Less (and 0% or Greater)

Mo is an element that increases the hardenability of steel, thereby increasing the strength of the steel. Accordingly, Mo may be included as necessary. In instances where Mo is to be included, it is preferable that a Mo content be greater than or equal to 0.01% so as to produce the effect. On the other hand, if Mo is included in an amount greater than 1.0%, the toughness may be reduced, and weldability may be degraded. Accordingly, in instances where Mo is to be included, it is preferable that the Mo content be less than or equal to 1.0%. The Mo content is more preferably greater than or equal to 0.05% and even more preferably greater than or equal to 0.10%. Furthermore, the Mo content is more preferably less than or equal to 0.70% and even more preferably less than or equal to 0.50%.

Nb: 0.15% or Less (and 0% or Greater)

Nb is an element that forms fine carbides and nitrides in steel, thereby contributing to improving the strength of the steel, and Nb is also an element that inhibits the coarsening of austenite during hot rolling, thereby contributing to refining the microstructures. Accordingly, Nb may be included as necessary. In instances where Nb is to be included, it is preferable that Nb be included in an amount greater than or equal to 0.002% so as to produce the effects. However, if a Nb content is greater than 0.15%, the yield ratio is increased, and the toughness is reduced. Accordingly, in instances where Nb is to be included, it is preferable that the Nb content be less than or equal to 0.15%. The Nb content is more preferably greater than or equal to 0.005% and even more preferably greater than or equal to 0.010%. The Nb content is more preferably less than or equal to 0.13% and even more preferably less than or equal to 0.10%.

V: 0.15% or Less (and 0% or Greater)

V is an element that forms fine carbides and nitrides in steel, thereby contributing to improving the strength of the steel. Accordingly, V may be included as necessary. In instances where V is to be included, it is preferable that V be included in an amount greater than or equal to 0.002% so as to produce the effect. However, if a V content is greater than 0.15%, the yield ratio is increased, and the toughness is reduced. Accordingly, in instances where V is to be included, it is preferable that the V content be less than or equal to 0.15%. The V content is more preferably greater than or equal to 0.005% and even more preferably greater than or equal to The V content is more preferably less than or equal to and even more preferably less than or equal to 0.10%.

Ca: 0.010% or Less (and 0% or Greater)

Ca spheroidizes sulfides, such as MnS, which are elongated to become thin in a hot rolling step, and, therefore, Ca is an element that contributes to improving the toughness of steel. Accordingly, Ca may be included as necessary. In instances where Ca is to be included, it is preferable that Ca be included in an amount greater than or equal to 0.0005% so as to produce the effect. However, if a Ca content is greater than 0.010%, Ca oxide clusters are formed in steel, which results in degraded toughness. Accordingly, in instances where Ca is to be included, it is preferable that the Ca content be less than or equal to 0.010%. The Ca content is more preferably greater than or equal to 0.0008% and even more preferably greater than or equal to 0.0010%. Furthermore, the Ca content is more preferably less than or equal to 0.008% and even more preferably less than or equal to 0.0060%.

B: 0.010% or Less (and 0% or Greater)

B is an element that reduces the ferrite transformation start temperature, thereby contributing to refining the microstructures. Accordingly, B may be included as necessary. In instances where B is to be included, it is preferable that B be included in an amount greater than or equal to 0.0003% so as to produce the effect. However, if a B content is greater than 0.010%, the yield ratio is increased, which results in degraded toughness. Accordingly, in instances where B is to be included, it is preferable that the B content be less than or equal to 0.010%. The B content is more preferably greater than or equal to 0.0005% and even more preferably greater than or equal to 0.0008%. The B content is more preferably less than or equal to 0.0050%, even more preferably less than or equal to 0.0030%, and still more preferably less than or equal to 0.0020%.

In the electric resistance welded steel pipe according to aspects of the present invention, it is preferable that the base metal zone have a wall thickness of 15 mm or greater and mm or less, because in this case, the electric resistance welded steel pipe can be suitably used, in particular, in large structures, such as civil engineering building structures and line pipes. In terms of a low yield ratio and high toughness, it is more preferable that the wall thickness be 15 mm or greater and 25 mm or less. As described above, in accordance with aspects of the present invention, both a low yield ratio and high toughness can be achieved even in a thick-walled pipe having a wall thickness greater than 15 mm. Consequently, in instances where the electric resistance welded steel pipe according to aspects of the present invention is used in large structures, excellent buckling resistance is provided. Furthermore, for similar reasons, it is preferable that the electric resistance welded steel pipe according to aspects of the present invention have an outside diameter of 350 mm or greater and 750 mm or less. In terms of a low yield ratio and high toughness, it is more preferable that the outside diameter be 400 mm or greater and 750 mm or less.

Now, an embodiment of a method for manufacturing the electric resistance welded steel pipe according to aspects of the present invention will be described.

In accordance with aspects of the present invention, the electric resistance welded steel pipe is manufactured as follows. A steel material having the chemical composition described above is heated to a heating temperature of 1100° C. or greater and 1300° C. or less; subsequently, the steel material is hot rolled by using a rough rolling finishing temperature of 850° C. or greater and 1150° C. or less, a finishing delivery temperature of 750° C. or greater and 900° C. or less, and a total rolling reduction ratio associated with a temperature of equal to and less than 930° C. of 50% or greater, to form a hot rolled sheet (i.e., a hot rolling step); subsequently, the hot rolled sheet is cooled by using an average cooling rate of 5° C./s or greater and 30° C./s or less and a finish cooling temperature of 400° C. or greater and 650° C. or less, the average cooling rate and the finish cooling temperature each being based on a temperature at a sheet-thickness-wise middle of the hot rolled sheet (i.e., a cooling step); subsequently, the cooled hot rolled sheet is coiled at a temperature of 400° C. or greater and 650° C. or less to form a hot rolled steel sheet (i.e., a coiling step); subsequently, the hot rolled steel sheet is subjected to roll forming at a temperature of −40° C. or less to form a cylindrical steel sheet, and the cylindrical steel sheet is welded by electric resistance welding to form a steel pipe material (i.e., a pipe production step); and subsequently, the steel pipe material is subjected to diameter reduction at a temperature of −40° C. or less (i.e., a sizing step).

In the following description of the manufacturing method, the temperature expressed in ° C. is a surface temperature of the steel material, the steel sheet (hot rolled sheet), and the steel pipe material unless otherwise specified. The surface temperature can be measured with a radiation thermometer or the like. The temperature of the sheet-thickness-wise middle of the steel sheet can be determined by calculating a temperature distribution of a cross section of the steel sheet by heat transfer analysis and correcting the result with the surface temperature of the steel sheet. The “hot rolled steel sheet” encompasses hot rolled sheets and hot rolled steel strips.

In accordance with aspects of the present invention, steelmaking processes for preparing the steel material (steel slab) are not particularly limited, and any known steelmaking process, such as those that use a converter, an electric furnace, a vacuum melting furnace, or the like, may be employed. Casting processes are also not particularly limited, and any known casting process, such as continuous casting processes, may be used to manufacture a steel material having a desired size. Note that instead of a continuous casting process, an ingot making-blooming process may be used, and this does not present problems. The molten steel may further be subjected to secondary refining, such as ladle refining.

[Hot Rolling Step]

Heating Temperature: 1100° C. or greater and 1300° C. or less If the heating temperature is less than 1100° C., the material to be rolled has high deformation resistance, which makes rolling difficult. On the other hand, if the heating temperature is greater than 1300° C., the austenite grains become coarse, which makes it impossible to obtain fine austenite grains by rolling (rough rolling and finish rolling), which is subsequently performed, and as a result, ensuring the average grain size of the steel microstructures of the electric resistance welded steel pipe intended in accordance with aspects of the present invention is difficult.

Accordingly, the heating temperature for the hot rolling step is specified to be 1100° C. or greater and 1300° C. or less. The heating temperature is more preferably greater than or equal to 1120° C. Furthermore, the heating temperature is more preferably less than or equal to 1280° C.

In accordance with aspects of the present invention, the process to be performed after the manufacture of the steel slab (slab) may be a conventional process in which the slab is cooled to room temperature and thereafter reheated or may be an energy-saving process, such as hot charge rolling in which the warm slab is not cooled to room temperature but instead is directly charged into a heating furnace or is incubated for a short time and thereafter immediately rolled. The use of such processes does not present problems.

Rough Rolling Finishing Temperature: 850° C. or Greater and 1150° C. or Less

If the rough rolling finishing temperature is less than 850° C., the surface temperature of the steel sheet becomes less than or equal to the ferrite transformation start temperature during the subsequent finish rolling, and, consequently, large amounts of deformed ferrite are formed, which results in an increased yield ratio. On the other hand, if the rough rolling finishing temperature is greater than 1150° C., a sufficient rolling reduction cannot be achieved in the austenite non-recrystallization temperature range, and, consequently, fine austenite grains cannot be obtained. As a result, ensuring the average grain size of the steel microstructures of the electric resistance welded steel pipe intended in accordance with aspects of the present invention becomes difficult, which results in reduced toughness. The rough rolling finishing temperature is more preferably greater than or equal to 860° C. Furthermore, the rough rolling finishing temperature is more preferably less than or equal to 1000° C.

Finish Rolling Start Temperature (Preferred Condition)

Preferably, a finish rolling start temperature is 800° C. or greater and 950° C. or less. If the finish rolling start temperature is less than 800° C., the surface temperature of the steel sheet becomes less than or equal to the ferrite transformation start temperature during the finish rolling, and, consequently, large amounts of deformed ferrite are formed, which results in an increased yield ratio. On the other hand, if the finish rolling start temperature is greater than 950° C., the austenite becomes coarse, and sufficient deformation bands cannot be introduced into the austenite. Consequently, ensuring the average grain size of the steel microstructures intended in accordance with aspects of the present invention is difficult, which results in reduced toughness. The finish rolling start temperature is more preferably greater than or equal to 820° C. Furthermore, the finish rolling start temperature is more preferably less than or equal to 930° C.

Finishing Delivery Temperature: 750° C. or Greater and 900° C. or Less

If the finishing delivery temperature is less than 750° C., the surface temperature of the steel sheet becomes less than or equal to the ferrite transformation start temperature during the finish rolling, and, consequently, large amounts of deformed ferrite are formed, which results in an increased yield ratio. On the other hand, if the finishing delivery temperature is greater than 900° C., a sufficient rolling reduction cannot be achieved in the austenite non-recrystallization temperature range, and, consequently, fine austenite grains cannot be obtained. As a result, ensuring the average grain size of the steel microstructures of the electric resistance welded steel pipe intended in accordance with aspects of the present invention becomes difficult, which results in reduced toughness. The finishing delivery temperature is more preferably greater than or equal to 770° C. Furthermore, the finishing delivery temperature is more preferably less than or equal to 880° C.

Total Rolling Reduction Ratio Associated with Temperature of Equal to and Less Than 930° C.: 50% or Greater In accordance with aspects of the present invention, sub-grains in the austenite are refined in the hot rolling step, to refine the ferrite, bainite, and remaining microstructures that are formed in the subsequent cooling step and coiling step, and, consequently, the steel microstructures of the electric resistance welded steel pipe that has the strength and toughness intended in accordance with aspects of the present invention can be obtained. The refining of sub-grains in the austenite in the hot rolling step requires a high rolling reduction ratio associated with the austenite non-recrystallization temperature range so that sufficient working strain can be introduced. To achieve this, the total rolling reduction ratio associated with a temperature of equal to and less than 930° C. is specified to be greater than or equal to 50% in accordance with aspects of the present invention.

If the total rolling reduction ratio associated with a temperature of equal to and less than 930° C. is less than 50%, sufficient working strain cannot be introduced in the hot rolling step, and, consequently, microstructures having the average grain size intended in accordance with aspects of the present invention cannot be obtained. The total rolling reduction ratio associated with a temperature of equal to and less than 930° C. is more preferably greater than or equal to 55% and even more preferably greater than or equal to 57%. The upper limit of the total rolling reduction ratio is not particularly limited; however, if the total rolling reduction ratio is greater than 80%, an effect of improving toughness becomes low with respect to the increase in the rolling reduction ratio, which merely increases the load on the mills. Accordingly, the total rolling reduction ratio associated with a temperature of equal to and less than 930° C. is preferably less than or equal to 80%. More preferably, the total rolling reduction ratio is less than or equal to 70%.

The "total rolling reduction ratio associated with a temperature of equal to and less than 930° C." is a total of rolling reduction ratios of rolling passes associated with a temperature range of equal to and less than 930° C.

[Cooling Step]

After the hot rolling step, the hot rolled sheet is cooled in the cooling step. In the cooling step, the cooling is performed by using an average cooling rate of 5° C./s or greater and 30° C./s or less and a finish cooling temperature of 400° C. or greater and 650° C. or less, the average cooling rate being an average over a range down to the finish cooling temperature.

Average Cooling Rate over Range from Start of Cooling to End of Cooling (Completion of Cooling): 5° C./s or Greater and 30° C./s or Less If the average cooling rate over the temperature range from the start of cooling to the end of cooling, which will be described later, is less than 5° C./s, based on the temperature at the sheet-thickness-wise middle of the hot rolled sheet, the frequency of nucleation of ferrite or bainite is reduced, which results in the coarsening of ferrite or bainite, and, consequently, microstructures having the average grain size intended in accordance with aspects of the present invention cannot be obtained. On the other hand, if the average cooling rate is greater than 30° C./s, large amounts of martensite are formed, which results in reduced toughness. The average cooling rate is preferably greater than or equal to 10° C./s. Furthermore, the average cooling rate is preferably less than or equal to 25° C./s.

In accordance with aspects of the present invention, from the standpoint of inhibiting the formation of ferrite at a surface of the steel sheet before being cooled, it is preferable that the cooling be started immediately after the completion of the finish rolling.

Finish Cooling Temperature: 400° C. or Greater and 650° C. or Less

If the finish cooling temperature is less than 400° C., based on the temperature at the sheet-thickness-wise middle of the hot rolled sheet, large amounts of martensite are formed, which results in reduced toughness. On the other hand, if the finish cooling temperature is greater than 650° C., the frequency of nucleation of ferrite or bainite is reduced, which results in the coarsening of ferrite or bainite, and, consequently, microstructures having the average grain size intended in accordance with aspects of the present invention cannot be obtained. Furthermore, concentration of C in the non-transformed austenite can be facilitated, and as a result, the volume fraction of austenite may be increased, and, therefore, the volume fraction of the bcc phase may be reduced. The finish cooling temperature is preferably greater than or equal to 430° C. Furthermore, the finish cooling temperature is preferably less than or equal to 620° C.

In accordance with aspects of the present invention, the average cooling rate is a value (cooling rate) determined by ((temperature of sheet-thickness-wise middle of hot rolled sheet before cooling−temperature of sheet-thickness-wise middle of hot rolled sheet after cooling)/cooling time) unless otherwise specified. Examples of methods for the cooling include water cooling, such as spraying of water from nozzles, and cooling by spraying a cooling gas. In accordance with aspects of the present invention, it is preferable that the cooling operation (process) be performed on both surfaces of the hot rolled sheet so that both the surfaces of the hot rolled sheet can be cooled under the same conditions.

[Coiling Step]

Coiling Temperature: 400° C. or greater and 650° C. or less After the cooling step, the hot rolled steel sheet is coiled in a coil form and subsequently allowed to be naturally cooled, in the coiling step. In the coiling step, the coiling is performed at a coiling temperature of 400° C. or greater and 650° C. or less in consideration of the steel sheet microstructures. If the coiling temperature is less than 400° C., large amounts of martensite are formed, which results in reduced toughness. If the coiling temperature is greater than 650° C., the frequency of nucleation of ferrite or bainite is reduced, which results in the coarsening of ferrite or bainite, and, consequently, microstructures having the average grain size intended in accordance with aspects of the present invention cannot be obtained. Furthermore, concentration of C in the non-transformed austenite can be facilitated, and as a result, the volume fraction of austenite may be increased, and, therefore, the volume fraction of the bcc phase may be reduced. The coiling temperature is preferably greater than or equal to 430° C. Furthermore, the coiling temperature is preferably less than or equal to 620° C.

[Pipe Production Step]

Temperature of Hot Rolled Steel Sheet: −40° C. or Less

After the coiling step, a pipe production process is carried out in the pipe production step. In the pipe production step, the hot rolled steel sheet is subjected to roll forming at a temperature of −40° C. or less while the hot rolled steel sheet is continuously uncoiled, to form a cylindrical open pipe (round steel pipe), and electric resistance welding is performed in which pipe-circumferential butt portions of the open pipe are melted by high-frequency electrical resistance heating and, during this process, are pressure-welded with upsetting caused by squeeze rolls, to form a steel pipe material.

A method for the cooling of the hot rolled steel sheet for the pipe production step is one in which the hot rolled steel sheet coiled in a coil form is cooled to −40° C. or less in advance. In addition, equipment for the pipe production may be partially cooled to −40° C. or less.

In the instance where the temperature of the hot rolled steel sheet is less than or equal to −40° C., dislocations that are introduced in the pipe production step can be inhibited from moving, which prevents the dislocations from being entangled with one another, and, consequently, the dislocations can remain as mobile dislocations. That is, the dislocations that are introduced into the grains are uniformly distributed, and, therefore, a high A value is achieved.

If the temperature of the hot rolled steel sheet in the pipe production step is greater than −40° C., the dislocations that are introduced in the pipe production step easily move, which causes the dislocations to be entangled with one another and, therefore, easily form cells, and as a result, mobile dislocations are reduced. The temperature of the hot rolled steel sheet in the pipe production step is more preferably less than or equal to −50° C. and even more preferably less than or equal to −55° C.

The lower limit of the temperature of the hot rolled steel sheet in the pipe production step is not particularly restricted. It is preferable that the lower limit be greater than or equal to −90° C., from the standpoint of an increase in the load of the pipe production due to an increase in the deformation resistance of the hot rolled steel sheet, temperature control for a hydraulic system and the like, and the cost of cooling. More preferably, the lower limit is greater than or equal to −80° C.

Amount of Upsetting for Electric Resistance Welding (Preferred Condition)

An amount of upsetting for the electric resistance welding is controlled in a manner such that inclusions, such as oxides and nitrides, which can cause a reduction in toughness, can be discharged with molten steel. Preferably, the amount of upsetting is greater than or equal to 20% of the sheet thickness. However, if the amount of upsetting is greater than 100% of the sheet thickness, the load on the squeeze rolls increases. Accordingly, it is preferable that the amount of upsetting be controlled to be within a range of 20% or greater of the sheet thickness and 100% or less of the sheet thickness. More preferably, the amount of upsetting is greater than or equal to 40% of the sheet thickness. More preferably, the amount of upsetting is less than or equal to 80% of the sheet thickness.

The amount of upsetting can be determined as the difference between an outer circumferential length of the steel pipe before the electric resistance welding (open pipe) and the outer circumferential length of the steel pipe after the electric resistance welding.

[Sizing Step]

Temperature for Diameter Reduction of Steel Pipe Material: −40° C. or Less

In the sizing step that follows the electric resistance welding, the steel pipe material is subjected to diameter reduction at −40° C. or less, which is performed with rolls (sizing rolls) disposed at upper, lower, left, and right positions with respect to the steel pipe material. Accordingly, an outside diameter and a roundness of the steel pipe material are adjusted to desired values.

Regarding methods for the cooling of the electric resistance welded steel pipe for the sizing step, examples of the methods include a method in which the sizing step is continuously performed immediately after the pipe production step, which is performed by cooling the hot rolled steel sheet to a temperature of −40° C. or less, as described above; and a method in which the sizing step is performed by re-cooling the electric resistance welded steel pipe after the pipe production step. In addition, equipment for the sizing step may be partially cooled to −40° C. or less.

In the instance where the temperature of the electric resistance welded steel pipe before the sizing step is less than or equal to −40° C., dislocations that are introduced in the sizing step can be inhibited from moving, which prevents the dislocations from being entangled with one another, and, consequently, the dislocations can remain as mobile dislocations. That is, the dislocations that are introduced into the grains are uniformly distributed, and, therefore, a high A value is achieved.

If the temperature of the electric resistance welded steel pipe in the sizing step is greater than −40° C., the dislocations that are introduced in the sizing step easily move, which causes the dislocations to be entangled with one another and, therefore, easily form cells, and as a result, mobile dislocations are reduced. The temperature of the electric resistance welded steel pipe in the sizing step is more preferably less than or equal to −50° C. and even more preferably less than or equal to −55° C.

The lower limit of the temperature of the electric resistance welded steel pipe in the sizing step is not particularly restricted. It is preferable that the lower limit be greater than or equal to −90° C., from the standpoint of an increase in the load of the sizing due to an increase in the deformation resistance of the electric resistance welded steel pipe, temperature control for a hydraulic system and the like, and the cost of cooling. More preferably, the lower limit is greater than or equal to −80° C.

Diameter Reduction Ratio (Preferred Condition)

To improve outside diameter accuracy and the roundness, it is preferable that the diameter reduction of the steel pipe be carried out in a manner such that a ratio of reduction in the circumferential length of the steel pipe in the sizing step is 0.5% or greater in total. However, if the diameter reduction is carried out in a manner such that the ratio of reduction in the circumferential length of the steel pipe is greater than 4.0% in total, the amount of bending in the pipe axis direction during the passage through the rolls is large, which results in an increased yield ratio. Accordingly, it is preferable that the diameter reduction be carried out in a manner such that the ratio of reduction in the circumferential length of the steel pipe is 0.5% or greater and 4.0% or less. The ratio is more preferably greater than or equal to 1.0%. Furthermore, the ratio is more preferably less than or equal to 3.0%.

In the sizing step that follows the electric resistance welding, the amount of bending in the pipe axis direction during the passage of the steel pipe material through the sizing rolls is to be reduced as much as possible, to inhibit an increase in the yield ratio. Accordingly, it is preferable that the diameter reduction be performed in multiple stages by using multiple sizing stands, and it is preferable that in each of the sizing stands, the diameter reduction be performed in a manner such that the ratio of reduction in the circumferential length of the pipe is less than or equal to 1.0% with respect to that of an adjacent sizing stand. Furthermore, the ratio is preferably greater than or equal to 0.50%.

The electric resistance welded steel pipe according to aspects of the present invention is manufactured with the above-described method for manufacturing the electric resistance welded steel pipe.

Note that the method for manufacturing the electric resistance welded steel pipe according to aspects of the present invention can be employed even for thick-walled pipes having a wall thickness of the base metal zone within a range of 15 mm or greater and 30 mm or less, as mentioned above.

The determination as to whether a steel pipe is an electric resistance welded steel pipe can be made as follows. The electric resistance welded steel pipe is cut in a direction perpendicular to the pipe axis direction, then, a cross section containing the weld (electric resistance weld) is polished and subsequently etched with an etchant, and thereafter, the cross section is observed with an optical microscope. When the pipe-circumferential width of the melted and solidified zone of the weld (electric resistance weld) is 1.0 μm or greater and 1000 μm or less over the entire thickness of the pipe, the pipe is an electric resistance welded steel pipe. The etchant may be an appropriate one selected in accordance with the composition of the steel and the type of the steel pipe.

The weld (electric resistance weld) is further described below with reference to the FIGURE. The FIGURE is a cross-sectional view in the pipe circumferential direction of the weld and a neighboring region. The FIGURE illustrates a state in which the cross section containing the weld has been polished and etched. As illustrated in the FIGURE, a melted and solidified zone 3 can be visually identified as a region having a microstructural morphology and a contrast that are different from those of a base metal zone 1 and a welded heat-affected zone 2. For example, in the instance of electric resistance welded steel pipes made of carbon steel or low alloy steel, the melted and solidified zone 3 can be identified as a region that appears white under an optical microscope, as viewed in the nital-etched cross section.

EXAMPLES

Aspects of the present invention will now be described in more detail with reference to Examples. Note that the present invention is not limited to the Examples described below.

Molten steels having the chemical composition shown in Table 1 were produced by steelmaking to form slabs (steel materials). The obtained slabs were each subjected to a hot rolling step, a cooling step, and a coiling step, which were performed under the conditions shown in Table 2, to form a hot rolled steel sheet (a hot rolled steel sheet for an electric resistance welded steel pipe).

After the coiling step, the hot rolled steel sheet was cooled to the temperature shown in Table 2 and subjected to roll forming to form a cylindrical open pipe (a round steel pipe), and the butt portions of the open pipe were welded to each other by electric resistance welding to form a steel pipe material (the pipe production step). Subsequently, the steel pipe material was subjected to diameter reduction at the temperature shown in Table 2 (the sizing step) to produce an electric resistance welded steel pipe having an outside diameter D (mm) and a wall thickness t (mm), shown in Table 2.

Various test specimens were cut from the obtained electric resistance welded steel pipe to perform dislocation analysis, microstructure analysis, a tensile test, and a Charpy impact test, which were conducted with the methods described below. In this instance, the various test specimens were cut from a region of the base metal zone that was away 90° in the pipe circumferential direction from the electric resistance weld, which was assumed to be at a position of 0°.

[Dislocation Analysis]

The dislocation density p was determined by performing X-ray diffraction on a test specimen prepared as follows. A cross section parallel to both a pipe longitudinal direction and a wall thickness direction was mirror-polished, and subsequently, a region of 100 μm of the cross section was electrolytically polished to remove a processed surface layer. The diffraction plane was a plane at a wall-thickness-wise middle. From the results of the X-ray diffraction, the determination was made by using the modified Williamson-Hall method and the modified Warren-Averbach method (Reference Literature 1 and 2, mentioned above). The X-ray source used was CuKα radiation. The tube voltage was 45 kV, and the tube current was 200 mA.

The parameter φ was determined from the results of the X-ray diffraction by using the direct-fitting/modified Williamson-Hall method (Reference Literature 3, mentioned above). The constants necessary for the direct-fitting/modified Williamson-Hall method (Reference Literature 3, mentioned above) were as follows: $\Gamma_0$=0.261, $C_{h00}{}^{s}$=0.298, $C_{h00}{}^{E}$=0.262, $q^s$=2.652, and $q^e$=1.372.

The Burgers vector b of dislocations was $0.248\times10^{-9}$ m.

The A value, which is correlated to a distribution state of dislocations, was determined from the obtained dislocation density ρ, the parameter φ, the Burgers vector b of dislocations, and equation (1).

$$A=\varphi/((\pi\rho/2)^{1/2}\times b) \quad (1)$$

The determined values are shown in Table 3.

[Microstructure Analysis]

The test specimen for the microstructure analysis was prepared as follows. A piece was cut such that the surface to be observed was a cross section that was parallel to both the pipe longitudinal direction and the wall thickness direction and was at the wall-thickness-wise middle. The piece was then mirror-polished and subsequently etched with nital. The microstructure analysis was carried out by observing microstructures at the wall-thickness-wise middle and capturing an image of the microstructures, with an optical microscope (magnification: 1000×) or a scanning electron microscope (SEM, magnification: 1000×).

From the obtained optical microscope image or SEM image, area fractions of ferrite, bainite, pearlite, and the remainder (martensite and austenite) were determined. The area fraction of each of the microstructures was determined as follows: the observation was performed on 5 or more fields of view, and an average of the obtained values of the fields of view was calculated as the area fraction. In this instance, each of the area fractions determined by the microstructure analysis was assumed to be the volume fraction of each of the microstructures.

Note that since it is difficult to distinguish martensite from austenite in optical microscope images and SEM images, the volume fraction of martensite was determined as follows: the area fraction of microstructures determined to be martensite or austenite from observation of the obtained SEM image was measured, thereafter, the volume fraction of austenite, which was measured with the method described below, was subtracted from the area fraction, and the resulting value was designated as the volume fraction of martensite.

The measurement of the volume fraction of austenite was carried out by X-ray diffraction by using a test specimen prepared in a manner similar to that of the test specimen for the dislocation analysis. Mo-Ka radiation was used for the measurement. From the integral intensities of the (200), (220), and (311) planes of fcc iron and the (200) and (211) planes of bcc iron, the volume fraction of austenite was determined. Furthermore, the volume fraction of the bcc phase was also determined.

The measurement of the average grain size was carried out as follows. A histogram of the grain size distribution was calculated by using an SEM/EBSD method (the histogram was a graph in which the horizontal axis represented the grain size, and the vertical axis represented an abundance ratio for the different grain sizes). An arithmetic mean of the grain sizes was determined. Specifically, the grain size was determined as follows. Misorientation angles between adjacent grains were determined, and boundaries having a misorientation angle of 15° or greater were considered to define the grains (grain boundaries); accordingly, the equivalent circular diameter of the grains was measured. The average equivalent circular diameter was assumed to be the average grain size. The equivalent circular diameter was defined as the diameter of a circle having an area equal to the area of the grain of interest.

The conditions for the measurement included an acceleration voltage of 15 kV, a measurement region of 500 μm×500 μm, and a measurement step size of 0.5 μm. Note that in the grain size analysis, grains with a grain size of less than 2.0 μm were regarded as measurement noise and excluded from the analysis objects, and the determined area fraction was assumed to be equal to the volume fraction.

The obtained results are shown in Table 3.

[Tensile Test]

The tensile test was conducted with a JIS No. 5 tensile test specimen in accordance with the specifications of JIS Z 2241. The tensile test specimen was cut such that the tensile direction was parallel to the pipe longitudinal direction. A yield stress YS (MPa) and a tensile strength TS (MPa) were measured, and a yield ratio YR (%), which is defined as (YS/TS)×100, was calculated. Note that the yield stress YS was flow stress at a nominal strain of 0.5%.

The obtained results are shown in Table 4.

[Charpy Impact Test]

The Charpy impact test was conducted as follows. A V-notch test specimen was cut from the wall-thickness-wise middle of the obtained electric resistance welded steel pipe, such that a longitudinal direction of the test specimen was parallel to the pipe longitudinal direction. The test was performed at −40° C. in accordance with the specifications of JIS Z 2242, to determine the absorbed energy (J). Three test specimens were used for each example, and an average of the absorbed energies was determined as the absorbed energy of the electric resistance welded steel pipe.

The obtained results are shown in Table 4.

TABLE 1

| Steel pipe | Chemical composition (mass %) | | | | | | | | | | | | | | |
|---|---|---|---|---|---|---|---|---|---|---|---|---|---|---|---|
| Nos. | C | Si | Mn | P | S | Al | N | Ti | Cu | Ni | Cr | Mo | Nb | V | Ca | B |
| 1 | 0.063 | 0.27 | 1.49 | 0.014 | 0.0032 | 0.033 | 0.0025 | 0.014 | — | — | 0.66 | 0.21 | 0.025 | 0.033 | 0.0034 | — |
| 2 | 0.035 | 0.43 | 1.43 | 0.003 | 0.0008 | 0.034 | 0.0031 | 0.024 | — | — | — | — | 0.059 | 0.024 | 0.0021 | — |
| 3 | 0.004 | 0.24 | 1.76 | 0.011 | 0.0047 | 0.039 | 0.0032 | 0.043 | 0.22 | 0.21 | — | — | — | — | — | — |
| 4 | 0.098 | 1.45 | 2.34 | 0.022 | 0.0064 | 0.021 | 0.0027 | 0.033 | — | — | — | — | — | — | — | — |
| 5 | 0.270 | 0.51 | 1.23 | 0.005 | 0.0004 | 0.022 | 0.0045 | 0.008 | 0.43 | 0.31 | — | — | 0.033 | — | 0.0037 | — |
| 6 | 0.320 | 0.44 | 0.99 | 0.009 | 0.0013 | 0.028 | 0.0021 | 0.040 | — | — | 0.09 | 0.08 | 0.024 | 0.019 | 0.0045 | — |
| 7 | 0.197 | 2.20 | 2.88 | 0.012 | 0.0026 | 0.038 | 0.0033 | 0.024 | — | — | — | — | 0.011 | 0.018 | — | — |
| 8 | 0.088 | 0.22 | 3.14 | 0.013 | 0.0031 | 0.040 | 0.0029 | 0.019 | — | — | — | — | 0.032 | 0.027 | — | 0.0032 |
| 9 | 0.132 | 0.30 | 0.68 | 0.005 | 0.0005 | 0.042 | 0.0041 | 0.007 | — | — | — | — | 0.046 | 0.041 | — | — |
| 10 | 0.229 | 0.08 | 0.90 | 0.008 | 0.0009 | 0.035 | 0.0035 | 0.035 | 0.34 | 0.62 | 0.13 | 0.14 | — | 0.035 | — | — |
| 11 | 0.055 | 1.45 | 2.34 | 0.014 | 0.0007 | 0.026 | 0.0038 | 0.016 | — | — | 0.23 | 0.17 | — | — | — | — |
| 12 | 0.176 | 0.11 | 1.32 | 0.017 | 0.0088 | 0.041 | 0.0024 | 0.021 | — | — | — | — | 0.03 | 0.02 | — | — |
| 13 | 0.122 | 0.31 | 1.15 | 0.011 | 0.0051 | 0.025 | 0.0038 | 0.015 | 0.15 | 0.16 | — | — | 0.03 | — | — | — |
| 14 | 0.122 | 0.31 | 1.15 | 0.011 | 0.0051 | 0.025 | 0.0038 | 0.015 | 0.15 | 0.16 | — | — | 0.03 | — | — | — |
| 15 | 0.122 | 0.31 | 1.15 | 0.011 | 0.0051 | 0.025 | 0.0038 | 0.015 | 0.15 | 0.16 | — | — | 0.03 | — | — | — |
| 16 | 0.122 | 0.31 | 1.15 | 0.011 | 0.0051 | 0.025 | 0.0038 | 0.015 | 0.15 | 0.16 | — | — | 0.03 | — | — | — |
| 17 | 0.122 | 0.31 | 1.15 | 0.011 | 0.0051 | 0.025 | 0.0038 | 0.015 | 0.15 | 0.16 | — | — | 0.03 | — | — | — |
| 18 | 0.122 | 0.31 | 1.15 | 0.011 | 0.0051 | 0.025 | 0.0038 | 0.015 | 0.15 | 0.16 | — | — | 0.03 | — | — | — |
| 19 | 0.045 | 0.19 | 1.09 | 0.008 | 0.0005 | 0.031 | 0.0040 | 0.014 | — | — | — | — | — | — | — | — |
| 20 | 0.173 | 0.81 | 1.98 | 0.009 | 0.0010 | 0.035 | 0.0044 | 0.137 | — | — | — | — | — | — | — | — |
| 21 | 0.053 | 0.46 | 1.54 | 0.022 | 0.0013 | 0.040 | 0.0037 | 0.039 | — | — | — | — | — | — | — | — |
| 22 | 0.150 | 0.25 | 1.22 | 0.020 | 0.0042 | 0.029 | 0.0034 | 0.024 | — | — | — | — | — | — | — | — |

TABLE 2

| | Hot rolling step | | | | Cooling step | | | |
|---|---|---|---|---|---|---|---|---|
| Steel pipe Nos. | Heating temperature (° C.) | Rough rolling finishing temperature (° C.) | Finishing delivery temperature (° C.) | Total rolling reduction ratio associated with temperature of equal to and less than 930° C. (%) | Average cooling rate (° C./s) | Finish cooling temperature (° C.) | Coiling step Coiling temperature (° C.) | Pipe production step Temperature (° C.) |
| 1 | 1250 | 1080 | 870 | 56 | 11 | 580 | 550 | −60 |
| 2 | 1200 | 930 | 880 | 62 | 22 | 620 | 590 | −60 |
| 3 | 1180 | 900 | 790 | 57 | 15 | 555 | 530 | −90 |
| 4 | 1200 | 870 | 810 | 71 | 8 | 485 | 465 | −75 |
| 5 | 1100 | 1100 | 800 | 55 | 10 | 510 | 490 | −50 |
| 6 | 1130 | 920 | 840 | 68 | 14 | 430 | 400 | −60 |
| 7 | 1250 | 890 | 860 | 63 | 17 | 600 | 570 | −60 |
| 8 | 1280 | 900 | 820 | 60 | 9 | 505 | 475 | −50 |
| 9 | 1150 | 940 | 770 | 57 | 20 | 470 | 440 | 15 |

TABLE 2-continued

| | | | | | | | | |
|---|---|---|---|---|---|---|---|---|
| 10 | 1230 | 980 | 830 | 54 | 11 | 690 | 670 | −60 |
| 11 | 1100 | 960 | 790 | 45 | 7 | 595 | 565 | −80 |
| 12 | 1210 | 920 | 810 | 56 | 9 | 615 | 600 | −65 |
| 13 | 1230 | 950 | 840 | 55 | 19 | 525 | 500 | −70 |
| 14 | 1320 | 1000 | 850 | 52 | 8 | 630 | 615 | −60 |
| 15 | 1200 | 1160 | 890 | 54 | 15 | 600 | 585 | −55 |
| 16 | 1200 | 970 | 920 | 55 | 12 | 615 | 600 | −60 |
| 17 | 1250 | 980 | 850 | 58 | 4 | 630 | 600 | −70 |
| 18 | 1230 | 950 | 840 | 57 | 18 | 670 | 660 | −60 |
| 19 | 1270 | 1130 | 860 | 54 | 26 | 540 | 520 | −60 |
| 20 | 1200 | 920 | 800 | 55 | 13 | 560 | 540 | −50 |
| 21 | 1130 | 910 | 810 | 61 | 22 | 610 | 590 | −60 |
| 22 | 1160 | 860 | 760 | 57 | 11 | 530 | 510 | −60 |

| | Pipe production step | Sizing step | | Steel pipe dimensions | | |
|---|---|---|---|---|---|---|
| Steel pipe Nos. | Amount of upsetting (mm) | Temperature (° C.) | Diameter reduction ratio (%) | Outside diameter D (mm) | Wall thickness t (mm) | Notes |
| 1 | 10 | −50 | 2.5 | 400 | 22 | Invention Example |
| 2 | 11 | −60 | 3.0 | 700 | 25 | Invention Example |
| 3 | 20 | −70 | 1.7 | 550 | 25 | Invention Example |
| 4 | 6 | −70 | 2.4 | 450 | 22 | Invention Example |
| 5 | 8 | −45 | 0.96 | 400 | 19 | Invention Example |
| 6 | 13 | −45 | 2.0 | 600 | 28 | Comparative Example |
| 7 | 7 | −55 | 1.6 | 450 | 25 | Comparative Example |
| 8 | 17 | −50 | 3.3 | 500 | 25 | Comparative Example |
| 9 | 8 | 15 | 1.5 | 400 | 22 | Comparative Example |
| 10 | 15 | −45 | 2.1 | 550 | 19 | Comparative Example |
| 11 | 19 | −60 | 3.2 | 550 | 28 | Comparative Example |
| 12 | 9 | −50 | 3.8 | 350 | 20 | Invention Example |
| 13 | 15 | −50 | 3.7 | 500 | 28 | Invention Example |
| 14 | 12 | −60 | 3.0 | 600 | 25 | Comparative Example |
| 15 | 8 | −50 | 2.8 | 600 | 25 | Comparative Example |
| 16 | 10 | −40 | 3.0 | 600 | 25 | Comparative Example |
| 17 | 15 | −60 | 2.5 | 600 | 25 | Comparative Example |
| 18 | 12 | −60 | 2.6 | 600 | 25 | Comparative Example |
| 19 | 18 | −50 | 2.8 | 500 | 22 | Invention Example |
| 20 | 15 | −40 | 2.0 | 550 | 20 | Invention Example |
| 21 | 14 | −50 | 2.4 | 600 | 28 | Invention Example |
| 22 | 13 | −50 | 1.9 | 550 | 25 | Invention Example |

TABLE 3

| | Steel microstructures | | | | | | | | | | | | |
|---|---|---|---|---|---|---|---|---|---|---|---|---|---|
| Steel pipe Nos. | bcc fraction (vol %) | F fraction (vol %) | B fraction (vol %) | (F + B) fraction (vol %) | Remaining microstructures | P fraction (vol %) | M fraction (vol %) | A fraction (vol %) | Average grain size (μm) | Dislocation density ρ ($m^{-2}$) | Parameter φ | A | Notes |
| 1 | 100 | 2 | 95 | 97 | P, M | 2 | 1 | 0 | 5.7 | $8.4 \times 10^{14}$ | 0.0060 | 0.67 | Invention Example |
| 2 | 97 | 62 | 34 | 96 | M, A | 0 | 1 | 3 | 8.4 | $4.5 \times 10^{14}$ | 0.0051 | 0.77 | Invention Example |
| 3 | 95 | 35 | 59 | 94 | M, A | 0 | 1 | 5 | 6.5 | $6.6 \times 10^{14}$ | 0.0049 | 0.61 | Invention Example |
| 4 | 100 | 23 | 71 | 94 | P, M | 4 | 2 | 0 | 5.3 | $7.1 \times 10^{14}$ | 0.0046 | 0.56 | Invention Example |
| 5 | 91 | 7 | 72 | 79 | M, A | 0 | 12 | 9 | 4.7 | $1.5 \times 10^{15}$ | 0.0098 | 0.81 | Invention Example |
| 6 | 92 | 25 | 54 | 79 | M, A | 0 | 13 | 8 | 5.9 | $7.8 \times 10^{14}$ | 0.0068 | 0.78 | Comparative Example |
| 7 | 96 | 43 | 47 | 90 | P, A | 6 | 0 | 4 | 5.5 | $4.9 \times 10^{14}$ | 0.0047 | 0.69 | Comparative Example |
| 8 | 99 | 11 | 76 | 87 | P, A | 12 | 0 | 1 | 6.0 | $6.2 \times 10^{14}$ | 0.0050 | 0.64 | Comparative Example |
| 9 | 100 | 48 | 44 | 92 | P | 8 | 0 | 0 | 7.3 | $3.9 \times 10^{14}$ | 0.0030 | 0.49 | Comparative Example |
| 10 | 78 | 8 | 58 | 66 | M, A | 0 | 12 | 22 | 8.5 | $1.7 \times 10^{15}$ | 0.0068 | 0.53 | Comparative Example |
| 11 | 93 | 27 | 65 | 92 | M, A | 0 | 1 | 7 | 17 | $2.5 \times 10^{14}$ | 0.0028 | 0.57 | Comparative Example |
| 12 | 95 | 67 | 20 | 87 | P, A | 8 | 0 | 5 | 10.1 | $3.9 \times 10^{14}$ | 0.0034 | 0.56 | Invention Example |

TABLE 3-continued

| Steel pipe Nos. | bcc fraction (vol %) | F fraction (vol %) | B fraction (vol %) | (F + B) fraction (vol %) | Remaining microstructures | P fraction (vol %) | M fraction (vol %) | A fraction (vol %) | Average grain size (μm) | Dislocation density ρ ($m^{-2}$) | Parameter φ | A | Notes |
|---|---|---|---|---|---|---|---|---|---|---|---|---|---|
| | Steel microstructures | | | | | | | | | | | | |
| 13 | 97 | 12 | 83 | 95 | P, M, A | 1 | 1 | 3 | 5.2 | $5.2 \times 10^{14}$ | 0.0043 | 0.60 | Invention Example |
| 14 | 100 | 78 | 10 | 88 | P | 12 | 0 | 0 | 16 | $3.3 \times 10^{14}$ | 0.0032 | 0.57 | Comparative Example |
| 15 | 100 | 81 | 9 | 90 | P | 10 | 0 | 0 | 17 | $3.5 \times 10^{14}$ | 0.0035 | 0.60 | Comparative Example |
| 16 | 99 | 80 | 7 | 87 | P, A | 12 | 0 | 1 | 16 | $4.1 \times 10^{14}$ | 0.0035 | 0.56 | Comparative Example |
| 17 | 100 | 85 | 3 | 88 | P | 12 | 0 | 0 | 17 | $2.1 \times 10^{14}$ | 0.0027 | 0.59 | Comparative Example |
| 18 | 98 | 88 | 0 | 88 | P, A | 10 | 0 | 2 | 19 | $3.8 \times 10^{14}$ | 0.0038 | 0.63 | Comparative Example |
| 19 | 100 | 3 | 91 | 94 | P, M | 4 | 2 | 0 | 5.3 | $6.3 \times 10^{14}$ | 0.0044 | 0.56 | Invention Example |
| 20 | 100 | 44 | 45 | 89 | P, M | 10 | 1 | 0 | 5.1 | $5.9 \times 10^{14}$ | 0.0046 | 0.61 | Invention Example |
| 21 | 97 | 4 | 88 | 92 | P, M, A | 4 | 1 | 3 | 6.4 | $4.7 \times 10^{14}$ | 0.0040 | 0.59 | Invention Example |
| 22 | 100 | 61 | 28 | 89 | P, M | 9 | 2 | 0 | 5.8 | $5.5 \times 10^{14}$ | 0.0042 | 0.57 | Invention Example |

*1. Description of symbols F: ferrite, B: bainite, P: pearlite, M: martensite, A: austenite
*2. $A = \varphi/((\pi\rho/2)^{1/2} \times b)$ . . . equation (1)

TABLE 4

| Steel pipe Nos. | YS (MPa) | TS (MPa) | YR (%) | Charpy absorbed energy at −40° C. (J) | Notes |
|---|---|---|---|---|---|
| | Mechanical properties | | | | |
| 1 | 552 | 639 | 86.4 | 224 | Invention Example |
| 2 | 425 | 518 | 82.0 | 152 | Invention Example |
| 3 | 479 | 571 | 83.9 | 177 | Invention Example |
| 4 | 525 | 593 | 88.5 | 203 | Invention Example |
| 5 | 638 | 764 | 83.5 | 198 | Invention Example |
| 6 | 531 | 639 | 83.1 | 75 | Comparative Example |
| 7 | 436 | 476 | 91.6 | 90 | Comparative Example |
| 8 | 443 | 485 | 91.3 | 169 | Comparative Example |
| 9 | 423 | 456 | 92.8 | 87 | Comparative Example |
| 10 | 707 | 759 | 93.1 | 146 | Comparative Example |
| 11 | 355 | 421 | 84.3 | 61 | Comparative Example |
| 12 | 425 | 492 | 86.4 | 124 | Invention Example |
| 13 | 463 | 530 | 87.4 | 130 | Invention Example |
| 14 | 389 | 471 | 82.6 | 78 | Comparative Example |
| 15 | 367 | 437 | 84.0 | 62 | Comparative Example |
| 16 | 412 | 498 | 82.7 | 55 | Comparative Example |
| 17 | 325 | 403 | 80.6 | 91 | Comparative Example |
| 18 | 417 | 504 | 82.7 | 88 | Comparative Example |
| 19 | 505 | 593 | 85.2 | 213 | Invention Example |
| 20 | 482 | 576 | 83.7 | 158 | Invention Example |
| 21 | 423 | 512 | 82.6 | 162 | Invention Example |
| 22 | 466 | 560 | 83.2 | 179 | Invention Example |

Referring to Tables 3 and 4, Steel pipe Nos. 1 to 5, 12, 13, and 19 to 22 are Invention Examples, and Steel pipe Nos. 6 to 11 and 14 to 18 are Comparative Examples.

All of the electric resistance welded steel pipes of the Invention Examples had steel microstructures of the base metal zone in which the bcc phase was present in a volume fraction greater than or equal to 80%, the average grain size was less than or equal to 15.0 μm, and the A value was 0.55 or greater and 0.85 or less. Furthermore, all of the electric resistance welded steel pipes of the Invention Examples had mechanical properties in which the yield ratio was less than or equal to 90%, and the Charpy absorbed energy at −40° C. was greater than or equal to 100 J.

REFERENCE SIGNS LIST

1 Base metal zone
2 Welded heat-affected zone
3 Melted and solidified zone

The invention claimed is:

1. An electric resistance welded steel pipe comprising a base metal zone and a weld, wherein steel microstructures at a wall-thickness-wise middle of the base metal zone are steel microstructures in which a bcc phase is present in a volume fraction greater than or equal to 80%, an average grain size is less than or equal to 15.0 μm, and an A value, defined by equation (1), is 0.55 or greater and 0.85 or less;

a yield ratio in a pipe axis direction is less than or equal to 90%; and a Charpy absorbed energy at −40° C. of the base metal zone is greater than or equal to 100 J, $$A=\varphi/((\pi\rho/2)^{1/2}\times b) \quad (1)$$

where φ is a parameter representing a working ratio determined by X-ray diffraction, ρ is a dislocation density ($m^{-2}$), b is a Burgers vector (m) of dislocations, and π is a ratio of a circumference of a circle to a diameter of the circle.

2. The electric resistance welded steel pipe according to claim 1, wherein the base metal zone has a chemical composition containing, in mass %, C: 0.001% or greater and 0.30% or less,
Si: 0.01% or greater and 2.0% or less,
Mn: 0.20% or greater and 3.0% or less,
P: 0.050% or less,
S: 0.020% or less,
Al: 0.005% or greater and 0.10% or less,
N: 0.010% or less, and
Ti: 0.15% or less, with a balance of Fe and incidental impurities.

3. The electric resistance welded steel pipe according to claim 2, wherein the chemical composition further contains, in mass %, one or two or more selected from Cu: 1.0% or less, Ni: 1.0% or less, Cr: 1.0% or less, Mo: 1.0% or less, Nb: 0.15% or less, V: 0.15% or less, Ca: 0.010% or less, and B: 0.010% or less.

4. The electric resistance welded steel pipe according to any claim 1, wherein the base metal zone has a wall thickness of 15 mm or greater and 30 mm or less.

5. The electric resistance welded steel pipe according to claim 2, wherein the base metal zone has a wall thickness of 15 mm or greater and 30 mm or less.

6. The electric resistance welded steel pipe according to claim 3, wherein the base metal zone has a wall thickness of 15 mm or greater and 30 mm or less.

7. The electric resistance welded steel pipe according to claim 1, wherein the steel microstructures at the wall-thickness-wise middle of the base metal zone are steel microstructures in which a total volume fraction of ferrite and bainite is greater than or equal to 85%.

8. The electric resistance welded steel pipe according to claim 2, wherein the steel microstructures at the wall-thickness-wise middle of the base metal zone are steel microstructures in which a total volume fraction of ferrite and bainite is greater than or equal to 85%.

9. The electric resistance welded steel pipe according to claim 3, wherein the steel microstructures at the wall-thickness-wise middle of the base metal zone are steel microstructures in which a total volume fraction of ferrite and bainite is greater than or equal to 85%.

10. The electric resistance welded steel pipe according to claim 4, wherein the steel microstructures at the wall-thickness-wise middle of the base metal zone are steel microstructures in which a total volume fraction of ferrite and bainite is greater than or equal to 85%.

11. The electric resistance welded steel pipe according to claim 5, wherein the steel microstructures at the wall-thickness-wise middle of the base metal zone are steel microstructures in which a total volume fraction of ferrite and bainite is greater than or equal to 85%.

12. The electric resistance welded steel pipe according to claim 6, wherein the steel microstructures at the wall-thickness-wise middle of the base metal zone are steel microstructures in which a total volume fraction of ferrite and bainite is greater than or equal to 85%.

13. A method for manufacturing the electric resistance welded steel pipe according to claim 1, the method comprising:

a hot rolling step in which a steel material is heated to a heating temperature of 1100° C. or greater and 1300° C. or less, the steel material is subsequently hot rolled by using a rough rolling finishing temperature of 850° C. or greater and 1150° C. or less, a finishing delivery temperature of 750° C. or greater and 900° C. or less, and a total rolling reduction ratio associated with a temperature of equal to and less than 930° C. of 50% or greater, to form a hot rolled sheet;

a cooling step in which the hot rolled sheet is cooled by using an average cooling rate of 5° C./s or greater and 30° C./s or less and a finish cooling temperature of 400° C. or greater and 650° C. or less, the average cooling rate and the finish cooling temperature each being based on a temperature at a sheet-thickness-wise middle of the hot rolled sheet;

a coiling step in which the hot rolled sheet is coiled at a temperature of 400° C. or greater and 650° C. or less to form a hot rolled steel sheet;

a pipe production step in which the hot rolled steel sheet is subjected to roll forming at a temperature of −40° C. or less to form a cylindrical steel sheet, and the cylindrical steel sheet is welded by electric resistance welding to form a steel pipe material; and a sizing step in which the steel pipe material is subjected to diameter reduction at a temperature of −40° C. or less to form the electric resistance welded steel pipe.

14. The method for manufacturing the electric resistance welded steel pipe according to claim 13, wherein the steel material has a chemical composition containing, in mass %, C: 0.001% or greater and 0.30% or less, Si: 0.01% or greater and 2.0% or less, Mn: 0.20% or greater and 3.0% or less, P: 0.050% or less, S: 0.020% or less, Al: 0.005% or greater and 0.10% or less, N: 0.010% or less, and Ti: 0.15% or less, with a balance of Fe and incidental impurities.

15. The method for manufacturing the electric resistance welded steel pipe according to claim 14, wherein the chemical composition further contains, in mass %, one or two or more selected from Cu: 1.0% or less, Ni: 1.0% or less, Cr: 1.0% or less, Mo: 1.0% or less, Nb: 0.15% or less, V: 0.15% or less, Ca: 0.010% or less, and B: 0.010% or less.

16. The method for manufacturing the electric resistance welded steel pipe according to claim 13, wherein the base metal zone of the electric resistance welded steel pipe has a wall thickness of 15 mm or greater and 30 mm or less.

17. The method for manufacturing the electric resistance welded steel pipe according to claim 15, wherein the base metal zone of the electric resistance welded steel pipe has a wall thickness of 15 mm or greater and 30 mm or less.

18. The method for manufacturing the electric resistance welded steel pipe according to claim 13, wherein the steel microstructures at the wall-thickness-wise middle of the base metal zone are steel microstructures in which a total volume fraction of ferrite and bainite is greater than or equal to 85%.

19. The method for manufacturing the electric resistance welded steel pipe according to claim 15, wherein the steel microstructures at the wall-thickness-wise middle of the base metal zone are steel microstructures in which a total volume fraction of ferrite and bainite is greater than or equal to 85%.

20. The method for manufacturing the electric resistance welded steel pipe according to claim 17, wherein the steel microstructures at the wall-thickness-wise middle of the base metal zone are steel microstructures in which a total volume fraction of ferrite and bainite is greater than or equal to 85%.

* * * * *